Figure 1:
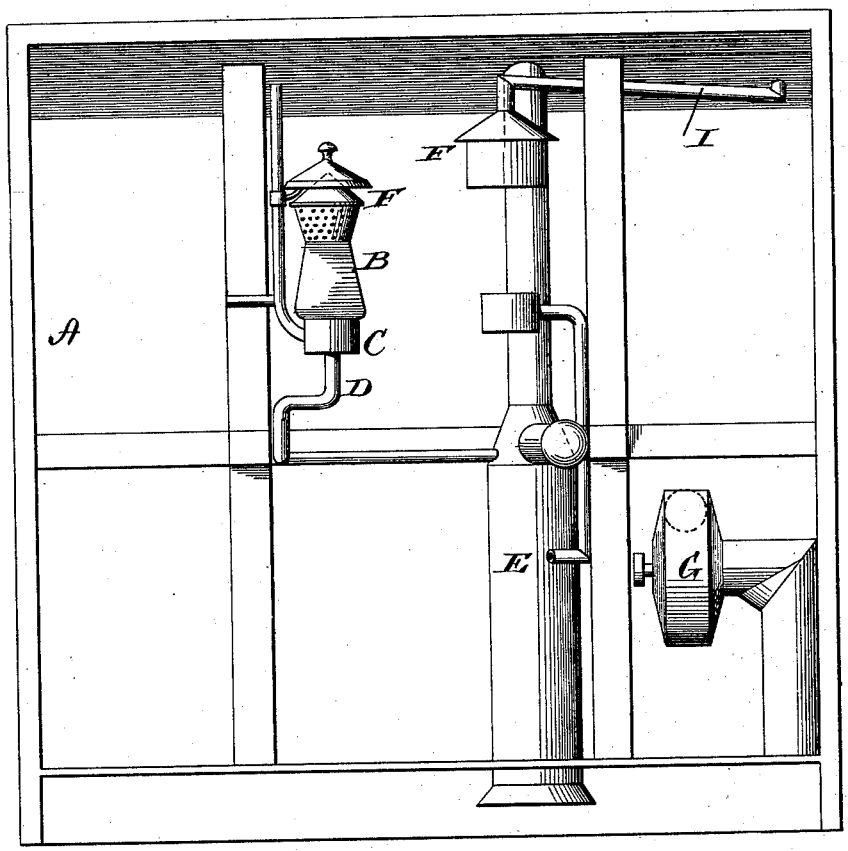

3 Sheets—Sheet 1.

V. P. HARRIS.
Ventilation for Mills, &c.

No. 216,398. Patented June 10, 1879.

WITNESSES

INVENTOR
V. P. Harris
By Alexander Mason
ATTORNEYS

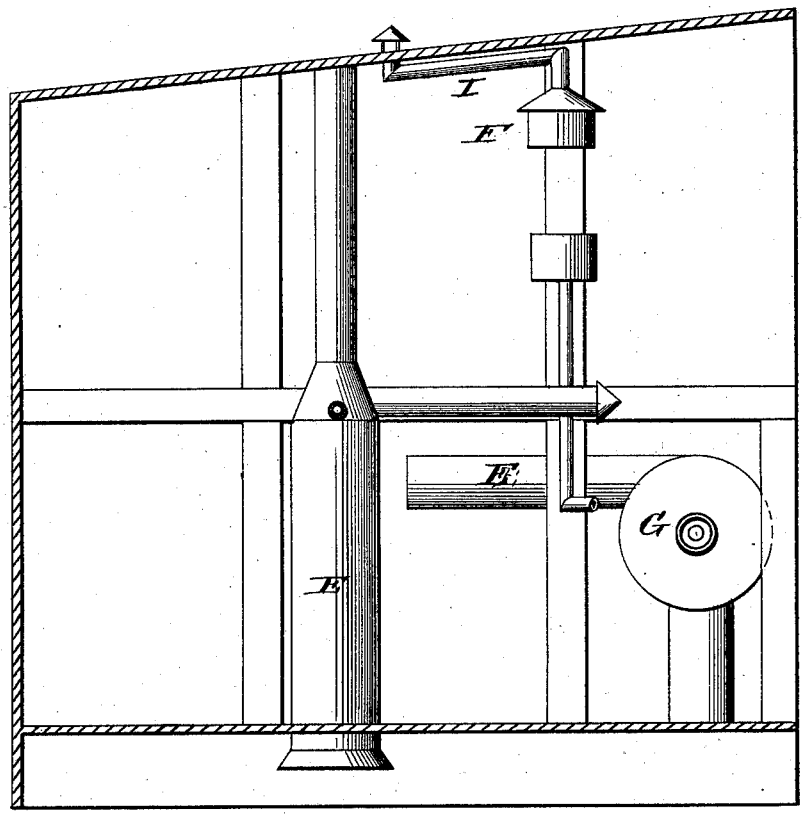

3 Sheets—Sheet 3.
V. P. HARRIS.
Ventilation for Mills, &c.
No. 216,398. Patented June 10, 1879.
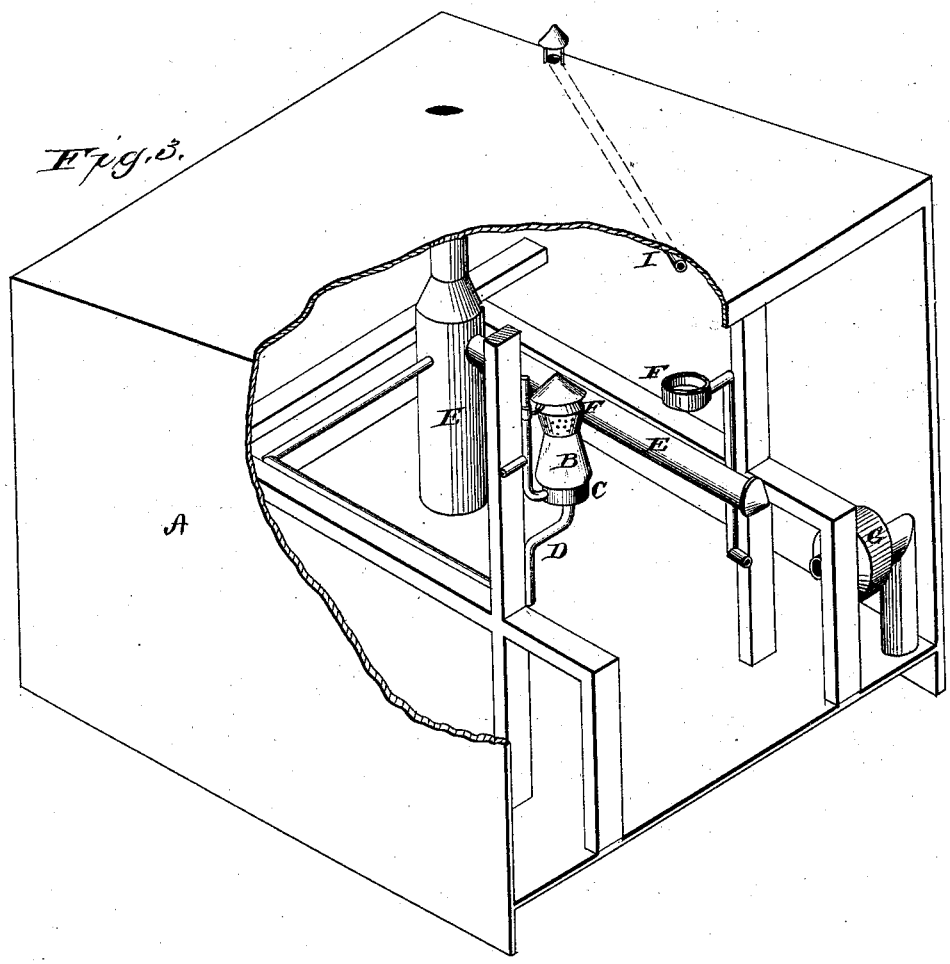
WITNESSES
INVENTOR
ATTORNEYS
N. PETERS, PHOTO-LITHOGRAPHER, WASHINGTON, D. C.

UNITED STATES PATENT OFFICE.

VENENDO P. HARRIS, OF GREENSBURG, INDIANA.

IMPROVEMENT IN VENTILATION FOR MILLS, &c.

Specification forming part of Letters Patent No. 216,398, dated June 10, 1879; application filed April 2, 1879.

*To all whom it may concern:*

Be it known that I, VENENDO P. HARRIS, of Greensburg, in the county of Decatur and State of Indiana, have invented certain new and useful Improvements in Ventilation for Mills, &c.; and do hereby declare that the following is a full, clear, and exact description thereof, reference being had to the accompanying drawings, and to the letters of reference marked thereon, making a part of this specification.

My invention relates particularly to flour-mills, and has for its object to prevent explosions from the impalpable explosive dust generated therein; and to this end the nature of my invention consists in making the bottoms of the lamps and lanterns used therein practically air-tight, and providing an air-chamber for the same, also providing air-conduits to open into said air-chamber sufficiently large to admit air enough to support combustion, as will be hereinafter more fully set forth.

In order to enable others skilled in the art to which my invention appertains to make and use the same, I will now proceed to describe how the same may be arranged and its operation, referring to the annexed drawings, which fully illustrate my invention.

Figure 1 is an interior elevation of a building showing my arrangement; Fig. 2, a vertical cross-section of a building showing same; Fig. 3, a perspective view of a building, a part broken away, illustrating the general interior arrangement of my device.

A represents the wall of the mill. B is a lamp or lantern placed therein, which is made air-tight at the bottom and formed with an air-chamber, C. D is the air-conduit to supply said chamber and lamp. A two-inch pipe has been found to be nearly the practical size of this air-conduit when a burner consuming eight feet of gas per hour is used. This air-conduit, when a number of lamps are used, extends to an air-riser, E, of sufficient capacity to furnish air for the number of lamps used, said air-riser or supply-pipe starting from any point desired where pure air can be obtained free from dust or gases and the proper current secured.

By this process I keep any dust or gas or vitiated air from passing into the lanterns, and at the same time I have a uniform current of pure air passing into said lamps, which not only enables me to produce an even, steady flame of high candle-power, but also prevents any dust or gases coming inside the lantern, which renders an explosion impossible, even if said lamps were placed in a tight room filled with illuminating-gas, for the products of combustion, assisted by the current of air escaping through the chimney F or escape-valve, will by said current keep any gas or dust from coming in contact with the flame or even settling on the outside of said valve or chimney when properly made.

The exit-valve or chimney F may be made of gauze-wire, perforated tin or brass, or other kindred material, and in a great variety of ways: its effect will be the same.

I so divide and arrange the air-conduits that when the lights are not burning I have a steady current of air coming into the lantern and escaping outward through the escape-valve or chimney, which prevents any dust or gases getting in.

If it is desired to place lamps in any building where I cannot easily arrange my air-conduits so as to obtain the necessary current of air, I place a small fan or blower, G, in the air-riser or supply-tube near its base or lower end, and by it I obtain any current of air desired.

These arrangements are especially adapted for use in flouring-mills, where the flour-dust is known to invade every accessible point, and experience has proven that said dust when floating in a current of air is as explosive as gunpowder.

By making the lanterns practically air-tight, except at the escape-valve, and causing a current of pure air to constantly pass through said lanterns, I prevent any of said dust or any explosive gases from getting therein, and consequently prevent any danger of explosion from said lights, and at the same time I keep the glass clear on the inside, which of itself is very desirable.

My invention is applicable where any kind of material is used for illuminating purposes, as any style of lamp or lantern may be provided with and have the process applied thereto.

Where it may be desired to carry off the products of combustion outside the room or building, I simply arrange an exit tube or pipe from the escape-valve on the lantern, at the outward end of which I place a valve or cover, allowing the products of combustion to escape in ratio to the current of air coming in.

Having thus fully described my invention, what I claim as new, and desire to secure by Letters Patent, is—

1. An air-tight lamp or lantern provided with an escape-valve, and connected with an air-conduit supplying pure air from the outside of the room or building, whereby a current of air is made to pass through said lamp or lantern, for the purposes herein set forth.

2. In combination with an air-tight lamp or lantern connected with an air-conduit, as described, an exit-tube for carrying off the products of combustion, substantially as herein set forth.

In testimony that I claim the foregoing I have hereunto set my hand this 22d day of March, 1879.

VENENDO P. HARRIS.

Witnesses:
GEORGE R. ROBINSON,
CHAS. G. PARKE.